United States Patent
Kim et al.

(10) Patent No.: US 9,893,348 B2
(45) Date of Patent: Feb. 13, 2018

(54) POSITIVE ACTIVE MATERIAL FOR LITHIUM SECONDARY BATTERY AND LITHIUM SECONDARY BATTERY

(71) Applicant: Samsung SDI Co., Ltd., Yongin-si, Gyeonggi-Do (KR)

(72) Inventors: Young-Ki Kim, Yongin-si (KR); Young-Hun Lee, Yongin-si (KR); Na-Leum Yoo, Yongin-si (KR); Na-Ri Park, Yongin-si (KR); Soon-Rewl Lee, Yongin-si (KR); Hong-Kyu Choi, Yongin-si (KR); Yong-Chul Park, Yongin-si (KR); Ick-Kyu Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 84 days.

(21) Appl. No.: 13/890,040

(22) Filed: May 8, 2013

(65) Prior Publication Data
US 2014/0212745 A1    Jul. 31, 2014

(30) Foreign Application Priority Data

Jan. 25, 2013   (KR) .................. 10-2013-0008666

(51) Int. Cl.
| | |
|---|---|
| *H01M 4/36* | (2006.01) |
| *H01M 4/131* | (2010.01) |
| *H01M 4/62* | (2006.01) |
| H01M 4/505 | (2010.01) |
| H01M 4/525 | (2010.01) |

(52) U.S. Cl.
CPC .......... *H01M 4/366* (2013.01); *H01M 4/131* (2013.01); *H01M 4/62* (2013.01); H01M 4/505 (2013.01); H01M 4/525 (2013.01)

(58) Field of Classification Search
CPC ........ H01M 4/366; H01M 4/131; H01M 4/62; H01M 4/505; H01M 4/525
See application file for complete search history.

(56) References Cited

U.S. PATENT DOCUMENTS 6,440,610 B1 * 8/2002 Sheem et al. .............. 429/231.8
6,458,487 B1 * 10/2002 Takeuchi et al. ............ 429/224
(Continued)

FOREIGN PATENT DOCUMENTS

| | | | |
|---|---|---|---|
| JP | 2000-215889 | * 4/2000 | ............. H01M 4/58 |
| JP | 2004-214210 A | 7/2004 | |

(Continued)

OTHER PUBLICATIONS

Korean Office Action dated Nov. 21, 2016 for Korean Patent Application No. KR 10-2013-0008666.

*Primary Examiner* — Oi K Conley
(74) *Attorney, Agent, or Firm* — Knobbe Martens Olson & Bear LLP (57) ABSTRACT

In an aspect, a positive active material for a rechargeable lithium battery including: a compound that reversibly intercalates and deintercalates lithium; and a coating layer coating the compound and including a metal nitrate is disclosed. Since the positive active material is structurally stable during the charge and discharge, the obtained battery may have excellent battery capacity and cycle-life characteristics and also have high power.

8 Claims, 4 Drawing Sheets

(56) References Cited

U.S. PATENT DOCUMENTS

| | | | |
|---|---|---|---|
| 6,881,520 B1* | 4/2005 | Li .................... | H01M 4/362 |
| | | | 429/218.1 |
| 2002/0192552 A1* | 12/2002 | Lampe-Onnerud et al. | . 429/223 |
| 2006/0275667 A1* | 12/2006 | Watanabe et al. ........ | 429/231.3 |
| 2007/0224506 A1* | 9/2007 | Ooyama ............... | C01G 23/04 |
| | | | 429/231.3 |
| 2008/0131778 A1* | 6/2008 | Watanabe ............. | H01M 4/131 |
| | | | 429/220 |
| 2009/0136850 A1 | 5/2009 | Yoon et al. | |
| 2011/0151328 A1 | 6/2011 | Chang et al. | |

FOREIGN PATENT DOCUMENTS

| | | |
|---|---|---|
| KR | 10-2000-0016626 A | 3/2000 |
| KR | 10-2006-0122779 A | 11/2006 |
| KR | 10-2009-0054636 A | 6/2009 |
| KR | 10-2010-0081954 A | 7/2010 |

* cited by examiner

FIG. 4

POSITIVE ACTIVE MATERIAL FOR LITHIUM SECONDARY BATTERY AND LITHIUM SECONDARY BATTERY

INCORPORATION BY REFERENCE TO RELATED APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0008666 filed on Jan. 25, 2013 in the Korean Intellectual Property Office, the disclosure of which is incorporated in its entirety herein by reference.

BACKGROUND

Field

This disclosure relates to a positive active material for a rechargeable lithium battery and a rechargeable lithium battery including the same.

Description of the Related Technology

Recently, due to reductions in size and weight of portable electronic equipment, there has been a need to develop batteries for the portable electronic equipment that have both high performance and large capacity.

Rechargeable lithium batteries include a negative electrode, a positive electrode, and an electrolyte, and generate electrical energy by oxidation and reduction reactions when lithium ions are intercalated/deintercalated in the positive electrode and negative electrode.

Such rechargeable lithium batteries typically use a lithium metal, a carbon-based material, Si, and the like for a negative active material. Metal chalcogenide compounds capable of intercalating and deintercalating lithium ions, and for example, composite metal oxide such as $LiCoO_2$, $LiMn_2O_4$, $LiNiO_2$, $LiNi_{1-x}Co_xO_2$ (0<X<1), $LiMnO_2$, and the like have typically been used as a positive active material of rechargeable lithium batteries. Recently, an attempt to develop an electrode having low resistance has been made by making the electrode into a thin film to achieve high power characteristics of a rechargeable lithium battery. However, the results have been unsatisfactory due to characteristics of an active material itself. Accordingly, a technique of adding a capacitor material, such as activated carbon, to an active material has been developed.

SUMMARY

One embodiment provides a positive active material for a rechargeable lithium battery that is structurally stable during charge and discharge, and has high battery capacity and improved cycle-life characteristics.

Another embodiment provides a rechargeable lithium battery including the positive active material.

Still another embodiment provides a positive active material for a rechargeable lithium battery including a compound that reversibly intercalates and deintercalates lithium and a coating layer coating the compound, and including a metal nitrate.

In some embodiments, the compound may be a compound represented by $Li_aCo_{1-b}G_bO_2$, $Li_aMn_{1-b}G_bO_2$ or $Li_aMn_{2-b}G_bO_4$ (0.90≤a≤1.8, 0≤b≤0.1, and G is selected from Al, Cr, Mn, Fe, Mg, La, Ce, Sr, V, and a combination thereof).

In some embodiments, the compound may have an average particle diameter of about 5 μm to about 15 μm.

In some embodiments, the metal nitrate may be a Ni nitrate, a Co nitrate, a Mn nitrate, a Mg nitrate, or a combination thereof, and a mixture of a Ni nitrate and a Mn nitrate. In some embodiments, the metal nitrite may be $NiNO_3$, $CoNO_3$, $MnNO_3$, or combination thereof. In some embodiments, the metal nitrite may be $NiNO_3$. In some embodiments, the metal nitrite may be $CoNO_3$. In some embodiments, the metal nitrite may be $MnNO_3$.

In some embodiments, the coating layer may include Ni and Mn at a mole ratio of about 2:8 to about 8:2.

In some embodiments, the coating layer may have a thickness of several nanometers to hundreds of nanometers, for example about 10 nm to about 100 nm. In some embodiments, the coating layer may be included in an amount of about 0.1 wt % to about 6 wt % based on 100 wt % of the positive active material.

Some embodiments provide a rechargeable lithium battery that includes a positive electrode, said positive electrode including a positive active material as disclosed and described herein; a negative electrode including a negative active material; and an electrolyte including an organic solvent and a lithium salt.

In some embodiments, the positive active material may be structurally stable during charge and discharge, and thus provides a battery having improved battery capacity, cycle-life characteristics, and high power.

DETAILED DESCRIPTION

Exemplary embodiments will hereinafter be described in detail. However, these embodiments are exemplary, and this disclosure is not limited thereto.

Some embodiments provide a positive active material including a compound that reversibly intercalates and deintercalates lithium; and a metal nitrate positioned on the surface of the compound.

In some embodiments, the metal nitrate may be present in a layered form coating the compound or may be present in an island form randomly present on the surface of the compound.

In some embodiments, the positive active material may further include a metal nitrite, a metal nitride, a metal cyanide, or a combination thereof. In some embodiments, the metal nitrite may be $NiNO_3$, $CoNO_3$, $MnNO_3$, or combination thereof. In some embodiments, the metal nitrite may be $NiNO_3$. In some embodiments, the metal nitrite may be $CoNO_3$. In some embodiments, the metal nitrite may be $MnNO_3$.

In some embodiments, the compound that reversibly intercalates and deintercalates lithium (lithiated intercalation compound) may be any compound that may be used as a positive active material of a rechargeable lithium battery. In some embodiments, the compound may include a composite oxide including at least one selected from cobalt, manganese, and nickel, as well as lithium.

Examples of the positive active material may be compounds represented by the following chemical formulae.

$Li_aA_{1-b}X_bD^1_2 (0.90 \leq a \leq 1.8, 0 \leq b \leq 0.5)$;

$Li_aA_{1-b}X_bO_{2-c}D^1_c (0.90 \leq a \leq 1.8, 0 \leq b \leq 0.5, 0 \leq c \leq 0.05)$;

$Li_aE_{1-b}X_bO_{2-c}D^1_c (0 \leq b \leq 0.5, 0 \leq c \leq 0.05)$;

$Li_aE_{2-b}X_bO_{4-c}D^1_c (0 \leq b \leq 0.5, 0 \leq c \leq 0.05)$;

$Li_aNi_{1-b-c}Co_bX_cD^1_\alpha (0.90 \leq a \leq 1.8, 0 \leq b \leq 0.5, 0 \leq c \leq 0.5, 0 < \alpha \leq 2)$;

$Li_aNi_{1-b-c}Co_bX_cO_{2-\alpha}T_\alpha (0.90 \leq a \leq 1.8, 0 \leq b \leq 0.5, 0 \leq c \leq 0.05, 0 < \alpha < 2)$;

$Li_aNi_{1-b-c}Co_bX_cO_{2-\alpha}T_2 (0.90 \leq a \leq 1.8, 0 \leq b \leq 0.5, 0 \leq c \leq 0.05, 0 < \alpha < 2)$;

$Li_aNi_{1-b-c}Mn_bX_cD^1_\alpha (0.90 \leq a \leq 1.8, 0 \leq b \leq 0.5, 0 \leq c \leq 0.05, 0 < \alpha \leq 2)$;

$Li_aNi_{1-b-c}Mn_bX_cO_{2-\alpha}T_\alpha (0.90 \leq a \leq 1.8, 0 \leq b \leq 0.5, 0 \leq c \leq 0.05, 0 < \alpha < 2)$;

$Li_aNi_{1-b-c}Mn_bX_cO_{2-\alpha}T_2 (0.90 \leq a \leq 1.8, 0 \leq b \leq 0.5, 0 \leq c \leq 0.05, 0 < \alpha < 2)$;

$Li_aNi_bE_cG_dO_2 (0.90 \leq a \leq 1.8, 0 \leq b \leq 0.9, 0 \leq c \leq 0.5, 0.001 \leq d \leq 0.1)$;

$Li_aNi_bCo_cMn_dG_eO_2 (0.90 \leq a \leq 1.8, 0 \leq b \leq 0.9, 0 \leq c \leq 0.5, 0 \leq d \leq 0.5, 0.001 \leq e \leq 0.1)$;

$Li_aNiG_bO_2 (0.90 \leq a \leq 1.8, 0.001 \leq b \leq 0.1)$ $Li_aCo_{1-b}G_bO_2 (0.90 \leq a \leq 1.8, 0 \leq b \leq 0.1)$;

$Li_aMn_{1-b}G_bO_2 (0.90 \leq a \leq 1.8, 0 \leq b \leq 0.1)$; $Li_aMn_{2-b}G_bO_4 (0.90 \leq a \leq 1.8, 0 \leq b \leq 0.1)$;

$Li_aCoG_bO_2 (0.90 \leq a \leq 1.8, 0.001 \leq b \leq 0.1)$; $Li_aMn_{1-b}G_bO_2 (0.90 \leq a \leq 1.8, 0.001 \leq b \leq 0.1)$;

$Li_aMnG_bO_4 (0.90 \leq a \leq 1.8, 0.001 \leq b \leq 0.1)$; $Li_aMn_{1-g}G_gPO_4 (0.90 \leq a \leq 1.8, 0 \leq g \leq 0.5)$;

$QO_2$; $QS_2$; $LiQS_2$; $V_2O_5$; $LiV_2O_5$; $LiZO_2$; $LiNiVO_4$; $Li_{(3-f)}J_2(PO_4)_3 (0 \leq f \leq 2)$;

$Li_{(3-f)}Fe_2(PO_4)_3$ $(0 \leq f \leq 2)$; and $LiFePO_4$

In the above chemical formulae, A may be selected from Ni, Co, Mn, and a combination thereof; X may be selected from Al, Ni, Co, Mn, Cr, Fe, Mg, Sr, V, a rare earth element, and a combination thereof; $D^1$ may be selected from O (oxygen), F (fluorine), S (sulfur), P (phosphorus), and a combination thereof; E may be selected from Co, Mn, and a combination thereof; T may be selected from F (fluorine), S (sulfur), P (phosphorus), and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

In some embodiments, the lithiated intercalation compound may be $Li_aCo_{1-b}G_bO_2$, $Li_aMn_{1-b}G_bO_2$, $Li_aMn_{2-b}G_bO_4$, $Li_aNi_bCo_cMn_dG_eO_2$ or a combination thereof. In the above formula, $0.90 \leq a \leq 1.8$, $0 \leq b \leq 0.1$, $0 \leq c \leq 0.5$, $0 \leq d \leq 0.5$, $0.001 \leq e \leq 0.1$, and G may be selected from Al, Cr, Mn, Fe, Mg, La, Ce, Sr, V, and a combination thereof. When the lithiated intercalation compound is a compound represented by $Li_aCoG_bO_2$, $Li_aMn_{1-b}G_bO_2$, or $Li_aMn_2G_bO_4$, the structural safety improvement effect during charging and discharging is more excellent according to providing a coating layer including a metal nitrate than the case of using other compounds.

In some embodiments, the lithiated intercalation compound may have an average particle diameter of about 5 μm to about 15 μm. When the lithiated intercalation compound had an average particle diameter within the range, the positive electrode may have more suitable electrode density.

In some embodiments, the coating layer may include a metal nitrate, so the positive active material may have more excellent structural safety during the charge and discharge compared to including a metal oxide. In some embodiments, the metal nitrate may include a metal of Ni, Co, Mn, Mg, or a combination thereof.

In some embodiments, the metal nitrate may be a Ni nitrate, a Co nitrate, a Mn nitrate, a Mg nitrate, or a combination thereof. In some embodiments, the metal nitrate may be a mixture of Ni nitrate and Mn nitrate. When the metal nitrate is a mixture of Ni nitrate and Mn nitrate, the batteries may have a better charge and discharge efficiency and cycle-life.

When the coating layer includes a mixture of the Ni nitrate and Mn nitrate as the metal nitrate, Ni and Mn may be present in a mole ratio of about 2:8 to about 8:2. When Ni and Mn are mixed at the mole ratio within the range, the further excellent characteristics may be provided.

In some embodiments, the coating layer may have a thickness of several nanometers to hundreds of nanometers, and specifically about 10 nm to about 100 nm. When the coating layer has the thickness within the range, the charge and discharge efficiency and the cycle-life characteristics of positive active material may be improved.

In some embodiments, the coating layer may be included in an amount of about 0.1 wt % to about 6 wt % based on 100 wt % of the positive active material. When the coating layer is included within the range, the charge and discharge efficiency and the cycle-life characteristics may be improved.

In some embodiments, the positive active material having the composition may be prepared by the following process.

In some embodiments, the compound that reversibly intercalates and deintercalates lithium is added into a metal nitrate solution, and the mixture is dried. In the metal nitrate solution, the solvent may include alcohol such as methanol, ethanol, and propanol. In some embodiments, the compound that reversibly intercalates and deintercalates lithium and the metal nitrate may be mixed at a ratio of about 99.9:0.1 wt % to about 90:10 wt %.

In some embodiments, the drying process may be performed at about 100° C. to about 120° C.

Then the dried product is performed with a heat treatment. In some embodiments, the heat treatment may be performed at about 900° C. to about 1050° C. In some embodiments, the heat treatment may be performed for about 5 hours to 10 hours. When the heat treatment is performed out of ranges of temperature and time, the cycle-life characteristics may be deteriorated.

Some embodiments provide a rechargeable lithium battery includes a positive electrode including the positive active material; a negative electrode including a negative active material; and an electrolyte.

In some embodiments, the positive electrode includes a positive active material layer including the positive active material according to one embodiment, a conductive material, and a binder and a current collector supporting the same.

In some embodiments, the positive active material may include a mixture of the positive active material having a coating layer including a metal nitrate according to one embodiment as a first positive active material, and a general lithiated intercalation compound as a second positive active material. The first and second positive active materials may be mixed in a weight ratio of about 8:2 to about 2:8.

In some embodiments of the positive active material layer, the positive active may be included in an amount of about 90 wt % to about 98 wt % based on the total weight of the positive active material layer. In some embodiments, the binder and conductive material may be respectively included in an amount ranging from about 1 wt % to about 5 wt % based on the total weight of the positive active material layer.

The binder improves binding properties of the positive active material particles to one another and to a current collector. Examples of the binder include at least one selected from polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like but are not limited thereto.

The conductive material improves electrical conductivity of a negative electrode. Any electrically conductive material can be used as a conductive agent unless it causes a chemical change. Examples of the conductive material include a carbon-based material of natural graphite, artificial graphite, carbon black, acetylene black, ketjen black, a carbon fiber, and the like; a metal-based material of a metal powder or a metal fiber including material copper, nickel, aluminum, silver, and the like; a conductive material such as a polyphenylene derivative and the like, or a mixture thereof.

In some embodiments, the current collector may be Al, but is not limited thereto.

In some embodiments, the positive electrode may be prepared in a method of preparing an active material composition by mixing the positive active material, a conductive material, and a binder and coating the active material composition on a current collector. In some embodiments, the solvent includes N-methylpyrrolidone and the like but is not limited thereto.

In some embodiments, the negative electrode may include a current collector and a negative active material layer disposed on the current collector, and the negative active material layer includes a negative active material.

In some embodiments, the negative active material includes a material that reversibly intercalates/deintercalates lithium ions, a lithium metal, a lithium metal alloy, a material being capable of doping/dedoping lithium, or a transition metal oxide.

In some embodiments, the material that can reversibly intercalate/deintercalate lithium ions includes a carbon material. In some embodiments, the carbon material may be any generally-used carbon-based negative active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, a mesophase pitch carbonization product, fired coke, and the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

In some embodiments, the material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. In some embodiments, the elements Q and R may be selected from Mg, Ca, Sr, Ti, Ni, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. In some embodiments, the elements Q and R may be Mg, Ca, Sr, Ba, Sc, Y, Ti, Zr, Hf, V, Nb, Ta, Cr, Mo, W, Re, Fe, Pb, Ru, Os, Rh, Ir, Pd, Pt, Cu, Ag, Au, Zn, Cd, B, Al, Ga, Sn, In, Tl, Ge, P, As, Sb, Bi, S, Se, Te, or a combination thereof.

In some embodiments, the transition metal oxide may include vanadium oxide, lithium vanadium oxide, and the like.

In some embodiments of the negative active material layer, the negative active material may be included in an amount of about 95 wt % to about 99 wt % based on the total weight of the negative active material layer.

In some embodiments, the negative active material layer may include a binder, and optionally a conductive material. In some embodiments, the negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. In some embodiments, the binder may include a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxymethyl cellulose, hydroxypropylmethyl cellulose, methyl cellulose, or alkali metal salts thereof. In some embodiments, the alkali metal may be Na, K, or Li. In some embodiments, the cellulose-based compound may be included in an amount of about 0.1 parts to about 3 parts by weight based on 100 parts by weight of the binder.

The conductive material is included to provide electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

In some embodiments, the current collector may include one selected from a copper foil, a nickel foil, a stainless steel foil, a titanium foil, a nickel foam, a copper foam, a polymer substrate coated with a conductive metal, and a combination thereof, but is not limited thereto.

In some embodiments, the electrolyte may include non-aqueous organic solvent and a lithium salt.

The non-aqueous organic solvent plays a role of transmitting ions taking part in the electrochemical reaction of a battery.

In some embodiments, the non-aqueous organic solvent may include a carbonate-based, ester-based, ether-based, ketone-based, alcohol-based, or aprotic solvent. In some embodiments, the carbonate-based solvent may include dimethylcarbonate (DMC), diethylcarbonate (DEC), dipropylcarbonate (DPC), methylpropylcarbonate (MPC), ethylpropylcarbonate (EPC), ethylmethylcarbonate (EMC), ethylenecarbonate (EC), propylenecarbonate (PC), butylenecarbonate (BC), and the like. In some embodiments, the ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. In some embodiments, the ether-based solvent may include dimethyl ether, dibutyl ether, tetraglyme, diglyme, dimethoxyethane, 2-methyltetrahydrofuran, tetrahydrofuran (THF), and the like. In some embodiments, the ketone-based solvent may include cyclohexanone, and the like. The alcohol-based solvent may include ethanol, isopropylalcohol, and the like. In some embodiments, the aprotic solvent include nitriles such as R—CN (wherein R is a C2 to C20 linear, branched, or cyclic hydrocarbon group, and may include one or more double bonds, one or more aromatic rings, or one or more ether bonds), amides such as dimethylformamide, dimethylacetamide, dioxolanes such as 1,3-dioxolane, sulfolanes, and the like.

In some embodiments, the non-aqueous organic solvent may be used singularly or in a mixture. When the organic solvent is used in a mixture, its mixture ratio can be controlled in accordance with desirable performance of a battery.

In some embodiments, the carbonate-based solvent may include a mixture of a cyclic carbonate and a linear carbonate. In some embodiments, the cyclic carbonate and the linear carbonate are mixed together in a volume ratio of about 1:1 to about 1:9 as an electrolyte, the electrolyte may have enhanced performance.

In some embodiments, the non-aqueous organic solvent of the present invention may be prepared by further adding the aromatic hydrocarbon-based solvent to the carbonate-based solvent. In some embodiments, the carbonate-based solvent and the aromatic hydrocarbon-based solvent may be mixed together in a volume ratio of about 1:1 to about 30:1.

In some embodiments, the aromatic hydrocarbon-based organic solvent may be represented by the following Chemical Formula 1.

Chemical Formula 1 wherein in Chemical Formula 1, $R_1$ to $R_6$ are each independently selected from hydrogen, a halogen, a C1 to C10 alkyl group, a haloalkyl group, and a combination thereof.

In some embodiments, the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In some embodiments, the non-aqueous electrolyte may further include vinylene carbonate or an ethylene carbonate-based compound represented by the following Chemical Formula 2 in order to improve cycle-life of a battery.

Chemical Formula 2 wherein in Chemical Formula 2, $R_7$ and $R_8$ are each independently selected from hydrogen, a halogen, a cyano (CN), a nitro ($NO_2$), and a C1 to C5 fluoroalkyl group, provided that at least one of $R_7$ and $R_8$ is a halogen, a cyano (CN), a nitro ($NO_2$), or a C1 to C5 fluoroalkyl group, and $R_7$ and $R_8$ are not simultaneously hydrogen.

In some embodiments, the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of such an additive for improving cycle life may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, and $LiB(C_2O_4)_2$ (lithium bis(oxalato) borate). In some embodiments, the lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

In some embodiments, a separator may be disposed between the positive electrode and negative electrode depending on a kind of a rechargeable lithium battery. Such a separator may use polyethylene, polypropylene, polyvinylidene fluoride or a multilayer of more than two thereof, for example a mixed multilayer such as a polyethylene/polypropylene double layered separator, a polyethylene/polypropylene/polyethylene triple layered separator, a polypropylene/polyethylene/polypropylene triple layered separator, and the like.

Figure 1:
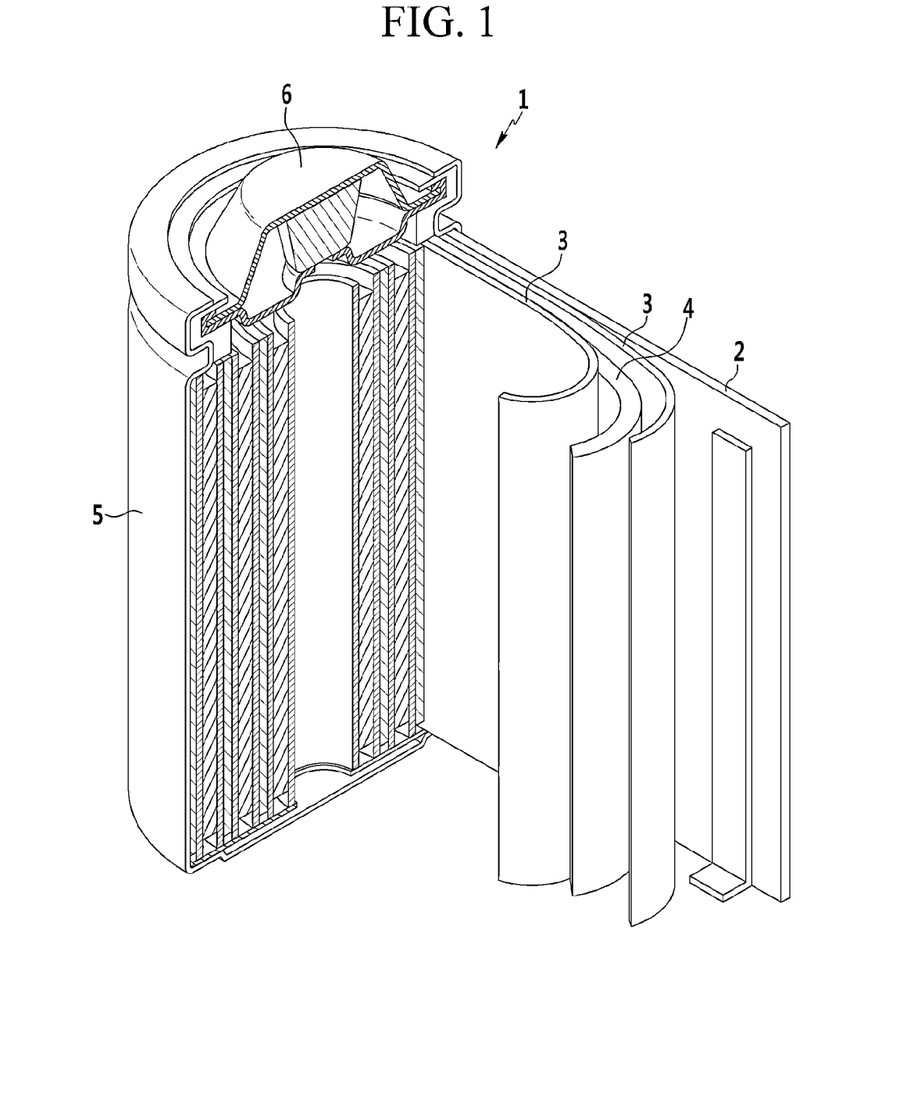
FIG. 1 is a schematic view showing the structure of a rechargeable lithium battery according to one embodiment.

As illustrated in FIG. 1, the rechargeable lithium battery 1 includes a battery case 5 including a positive electrode 2, a negative electrode 4, and a separator 3 interposed between the positive electrode 2 and negative electrode 4, an electrolyte impregnated therein, and a sealing member 6 sealing the battery case 5.

The following examples illustrate the present invention in more detail. However, these examples, however, should not in any sense be interpreted as limiting the scope of the present invention.

EXAMPLES

Synthesis Example 1

$Li_2CO_3$ (32.69 g), $Co_3O_4$ (66.97 g), and MgO (0.34 g) were mixed, and the mixture was subjected to a first heat-treatment. The first heat treatment was performed at 1050° C. for 10 hours. The first heat treatment product was pulverized to provide a $Li_{1.05}Co_{0.99}Mg_{0.01}O_2$ compound.

Synthesis Example 2

$Li_{1.05}Co_{0.99}Mg_{0.01}O_2$ compound (100 g, obtained from Synthesis Example 1) was added into Al isopropoxide solution (20 g, a mixed solution of 0.39 g of Al isopropoxide and 19.61 g of ethanol) and dried at 120° C. The dried product was subjected to a secondary heat treatment at 650° C. for 5 hours to provide a positive active material. The obtained positive active material had a structure including $Li_{1.05}Co_{0.99}Mg_{0.01}O_2$ compound and Al hydroxide present in a layer on the surface of the compound.

Synthesis Example 3

$Li_{1.05}Co_{0.99}Mg_{0.01}O_2$ 100 g, compound obtained from Synthesis Example 1) was added into $NiNO_3.6H_2O$ solution (20 g, mixed solution of 8.88 g of $NiNO_3.6H_2O$ and 11.12 g of ethanol) and dried at 120° C.

The dried product was subjected to a secondary heat treatment at 1050° C. for 10 hours to provide a positive active material. The obtained positive active material had a structure including $Li_{1.05}Co_{0.99}Mg_{0.01}O_2$ compound and nickel nitrate present in a layer on the surface of the compound. The $Li_{1.05}Co_{0.99}Mg_{0.01}O_2$ compound had an average particle diameter of 15 μm, and the nickel nitrate was included in about 5.5 wt % based on 100 wt % of obtained entire positive active material. In addition, the layered nickel nitrate, which is a coating layer, had a thickness of 100 nm.

Synthesis Example 4

$Li_{1.05}Co_{0.99}Mg_{0.01}O_2$ (100 g, compound obtained from Synthesis Example 1) was added into $CoNO_3.6H_2O$ solution (20 g, a mixed solution of 9.17 g of $CoNO_3.6H_2O$ and 10.83 g of ethanol) and dried at 120° C. The dried product was subjected to a secondary heat treatment at 1050° C. for 10 hours to provide a positive active material. The obtained positive active material had a structure including $Li_{1.05}Co_{0.99}Mg_{0.01}O_2$ compound and cobalt nitrate present in a layer on the surface of the compound. The $Li_{1.05}Co_{0.99}Mg_{0.01}O_2$ compound had an average particle diameter of 15 μm, and the cobalt nitrate was included in 5.7 wt % based on 100 wt % of obtained entire positive active material. In addition, the layered cobalt nitrate, which is a coating layer, had a thickness of 100 nm.

Synthesis Example 5

$Li_{1.05}Co_{0.99}Mg_{0.01}O_2$ (100 g, compound obtained from Synthesis Example 1) was added into $MnNO_3.6H_2O$ solution (20 g, mixed solution of 9.17 g of $MnNO_3.6H_2O$ and 10.83 g of ethanol) and dried at 120° C. The dried product was subjected to a secondary heat treatment at 1050° C. for 10 hours to provide a positive active material. The obtained positive active material had a structure including $Li_{1.05}Co_{0.99}Mg_{0.01}O_2$ compound and cobalt nitrate present in a layer on the surface of the compound. The $Li_{1.05}Co_{0.99}Mg_{0.01}O_2$ compound had an average particle diameter of 15 μm, and the manganese nitrate is included in 4.8 wt % based on 100 wt % of entire obtained positive active material. In addition, the layered cobalt nitrate, which is a coating layer, had a thickness of 100 nm.

Synthesis Example 6

$Li_{1.05}Co_{0.99}Mg_{0.01}O_2$ (100 g, compound obtained from Synthesis Example 1) was added into $NiNO_3.6H_2O$ and $MnNO_3.4H_2O$ solution (20 g, mixed solution of $NiNO_3.6H_2O$ (4.44 g) and $MnNO_3.4H_2O$ (3.75 g) (mole ratio 1:1 and 11.12 g of ethanol) and dried at 120° C. The dried product was subjected to a secondary heat treatment at 1050° C. for 10 hours to provide a positive active material. The obtained positive active material had a structure including $Li_{1.05}Co_{0.99}Mg_{0.01}O_2$ compound and a mixture of nickel nitrate and manganese nitrate present in a layer on the surface of the compound. The $Li_{1.05}Co_{0.99}Mg_{0.01}O_2$ compound had an average particle diameter (D50) of about 2 μm to 30 μm, and the manganese nitrate was included in 2.39 wt %, and the nickel nitrate was included in 2.75 wt % based on 100 wt % of entire obtained positive active material. In addition, the layered mixture of nickel nitrate and manganese nitrate, which is a coating layer, had a thickness of 100 nm.

Figure 2:
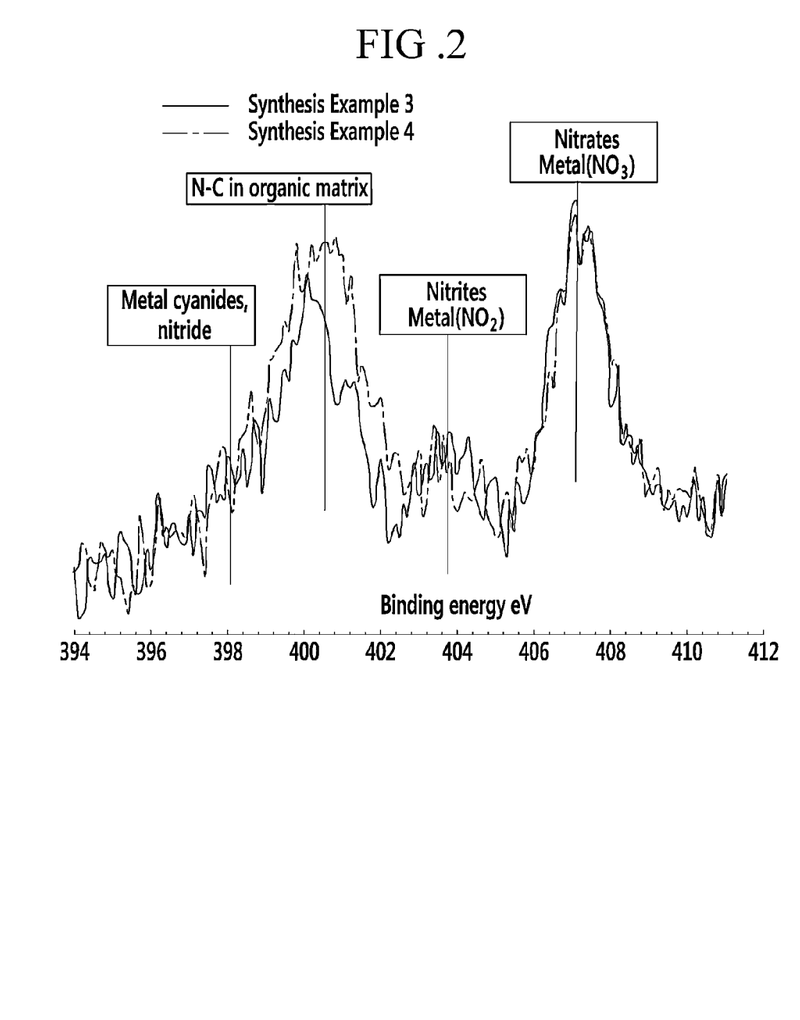
FIG. 2 is a graph showing XPS analysis results of the positive active materials obtained from Synthesis Examples 3 and 4.

The positive active materials obtained from Synthesis Examples 3 and 4 were subjected to XPS analysis to measure the compound present on the surface, and the results are shown in FIG. 2. As shown in FIG. 2, it is confirmed that the active materials from Synthesis Examples 1 and 2 include nickel nitrate on the surface thereof, and nickel nitrite, nickel cyanide, nickel nitride were also present. In FIG. 2, the N—C inorganic matrix was N—C and a complex of metal, but not possible to measure specific composition.

Figure 3:
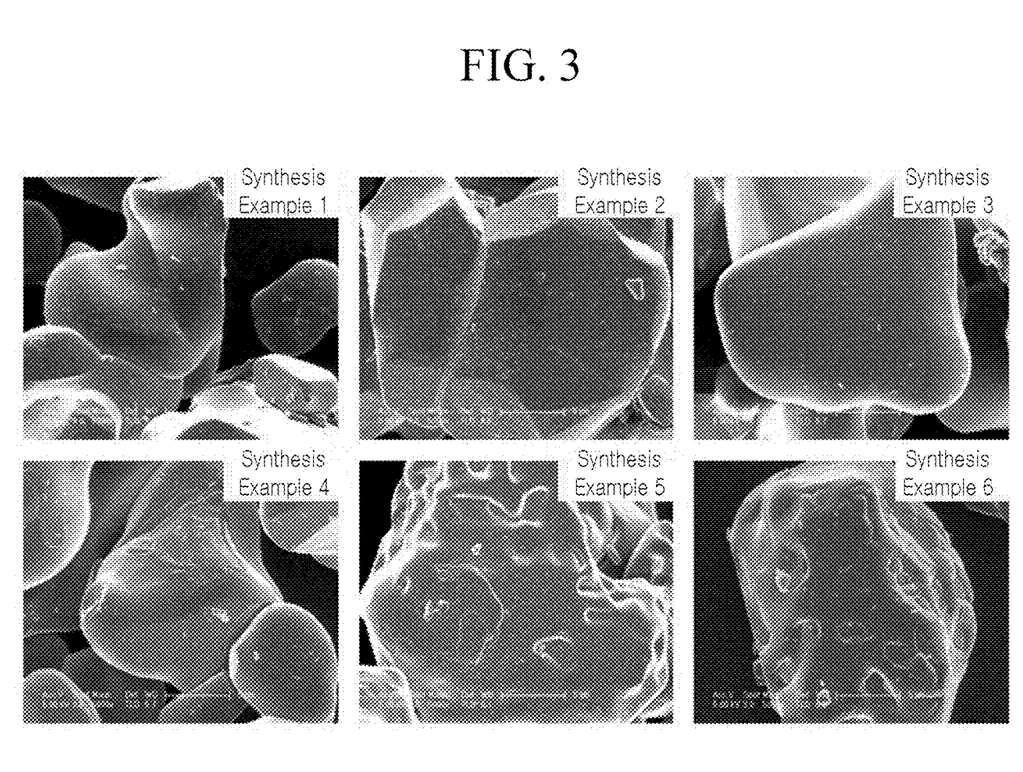
FIG. 3 is a SEM photograph of the positive active materials obtained from Synthesis Examples 1 to 6.

FIG. 3 shows SEM photographs of the positive active materials obtained from Synthesis Examples 1 to 6. As shown in FIG. 3, the positive active material of Synthesis Example 1 including no coating layer had a similar surface to the positive active material obtained from Synthesis Examples 2 to 6, so it is confirmed that the coating layer was uniformly formed. Since Synthesis Examples 5 and 6 include manganese in the coating layer, it is considered that the surface is somewhat different.

Example 1

The positive active material according to Synthesis Example 3, a polyvinylidene fluoride binder, and a denka black conductive material were mixed in a N-methylpyrrolidone solvent at a weight ratio of 94:3:3 wt % to provide a positive active material composition.

The positive active material composition was coated on an Al current collector, dried, and compressed according to the general method to provide a positive electrode.

Using the positive electrode, a lithium metal counter electrode, and an electrolyte solution, a coin half-cell was fabricated. The electrolyte solution was prepared by dissolving 1.15M of $LiPF_6$ in a mixed organic solvent of ethylene carbonate, ethylmethyl carbonate, and dimethyl carbonate (3:3:4 volume ratio).

Example 2

A coin half-cell was fabricated in accordance with the same procedure as in Example 1, except using the positive active material obtained from Synthesis Example 4.

Example 3

A coin half-cell was fabricated in accordance with the same procedure as in Example 1, except using the positive active material obtained from Synthesis Example 5.

Example 4

A coin half-cell was fabricated in accordance with the same procedure as in Example 1, except using the positive active material obtained from Synthesis Example 6.

Comparative Example 1

A coin half-cell was fabricated in accordance with the same procedure as in Example 1, except using the positive active material obtained from Synthesis Example 1.

Comparative Example 2

A coin half-cell was fabricated in accordance with the same procedure as in Example 1, except using the positive active material obtained from Synthesis Example 2.

The half-cell obtained from Examples 1 to 4 and Comparative Examples 1 to 2 were charged and discharged at 1C (=160 mAh/g) to 4.5V for one time to measure the charge and discharge capacity. The results are shown in the following Table 1. In addition, the charge and discharge efficiency was calculated, and the results are shown in the following Table 1.

TABLE 1

| | Charge capacity (mAh/g) | Discharge capacity (mAh/g) | Efficiency (%) |
|---|---|---|---|
| Comparative Example 1 | 198.53 | 182.68 | 92.01 |
| Comparative Example 2 | 193.63 | 185.14 | 95.62 |
| Example 1 | 199.67 | 188.30 | 94.31 |
| Example 2 | 202.71 | 196.47 | 96.72 |
| Example 3 | 199.47 | 193.15 | 96.83 |
| Example 4 | 201.78 | 192.28 | 95.30 |

As shown in Table 1, the cells obtained from Examples 1 to 4 had superior charge capacity and discharge capacity to those of Comparative Examples 1 and 2, and the efficiency was excellent.

Figure 4:
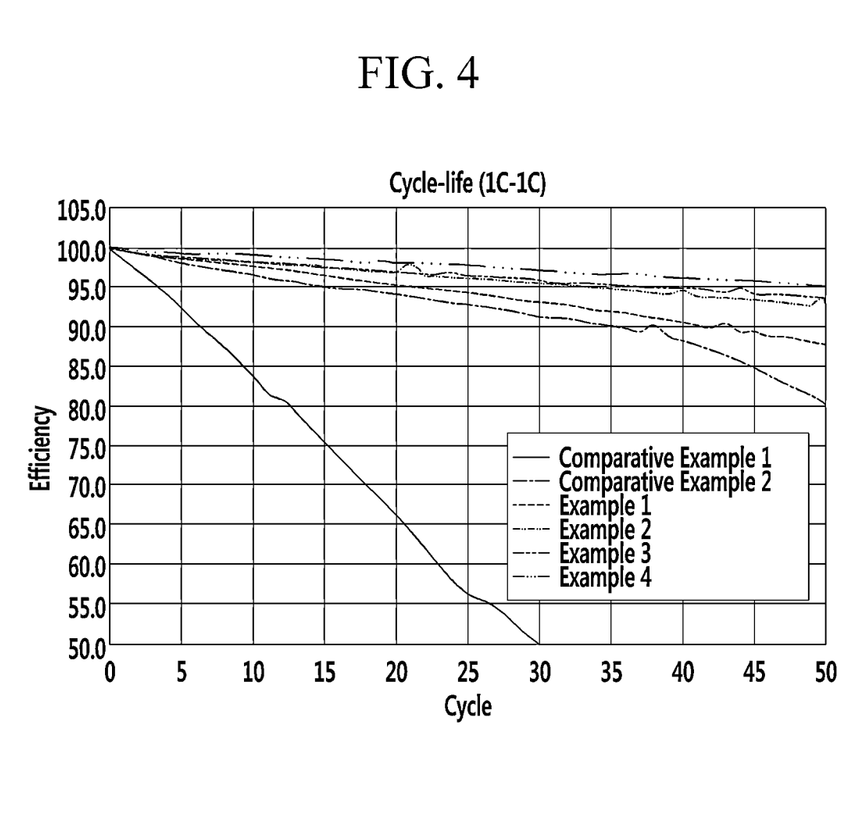
FIG. 4 is a graph showing cycle-life characteristics of half-cells obtained from Examples 1 to 4 and Comparative Examples 1 to 2.

In addition, the half cells obtained from Examples 1 to 4 and Comparative Examples 1 to 2 were charged and discharged at 1C for 50 times, and the charge and discharge efficiency according to each cycle was shown in FIG. 4. As shown in FIG. 4, the charge and discharge efficiency of Examples 1 to 4 are less deteriorated than those of Comparative Examples 1 and 2 when charged and discharged for 50 times, thus, it may be estimated that the cycle-life characteristics were excellent. Particularly, the efficiency was remarkably deteriorated in the case of Comparative Example 1.

In the present disclosure, the terms "Example," "Comparative Example," and "Synthesis Example" are used arbitrarily to simply identify a particular example or experimentation and should not be interpreted as admission of prior art. While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A rechargeable lithium battery comprising:
a positive electrode comprising a positive active material;
a negative electrode comprising a negative active material; and
an electrolyte comprising an organic solvent and a lithium salt,
wherein the positive active material comprises a compound represented by $Li_aCo_{1-b}G_bO_2$, or $Li_aMn_{1-b}G_bO_2$, (0.90≤a ≤1.8, 0<b <0.1, G is selected from Al, Fe, Mg, La, Ce, Sr, V, and combinations thereof);
a coating layer located on the surface of the compound and comprising a metal nitrate, wherein the coating layer has a thickness of about 10 nm to about 100 nm;
wherein the coating layer is included in about 0.1 wt% to about 6 wt% based on 100 wt% of the entire positive active material; and
wherein the metal nitrate is a Ni nitrate, a Co nitrate, a Mn nitrate, a Mg nitrate, or a combination thereof.

2. The rechargeable lithium battery of claim 1, wherein the compound is represented by $Li_aCo_{1-b}Mg_bO_2$.

3. The rechargeable lithium battery of claim 1, wherein the metal nitrate is $NiNO_3$, $CoNO_3$, $MnNO_3$, or a combination thereof.

4. The rechargeable lithium battery of claim 3, wherein the metal nitrate is $NiNO_3$.

5. The rechargeable lithium battery of claim 3, wherein the metal nitrate is $CoNO_3$.

6. The rechargeable lithium battery of claim 3, wherein the metal nitrate is $MnNO_3$.

7. The positive active material for a rechargeable lithium battery of claim 1, wherein the compound has an average particle diameter of about 5 μm to about 15 μm.

8. The positive active material for a rechargeable lithium battery of claim 1, wherein the coating layer has a thickness of about 100 nm.

\* \* \* \* \*